United States Patent
Gupta et al.

(10) Patent No.: US 12,505,142 B2
(45) Date of Patent: Dec. 23, 2025

(54) DECARBONIZING BERT WITH TOPICS FOR EFFICIENT DOCUMENT CLASSIFICATION

(71) Applicant: Siemens Aktiengesellschaft, Munich (DE)

(72) Inventors: Pankaj Gupta, Munich (DE); Thomas Runkler, Munich (DE); Khushbu Saxena, Zürich (CH)

(73) Assignee: DRIMCO GMBH, Munich (DE)

( * ) Notice: Subject to any disclaimer, the term of this patent is extended or adjusted under 35 U.S.C. 154(b) by 235 days.

(21) Appl. No.: 18/040,788

(22) PCT Filed: Aug. 5, 2020

(86) PCT No.: PCT/EP2020/072039
§ 371 (c)(1),
(2) Date: Feb. 6, 2023

(87) PCT Pub. No.: WO2022/028690
PCT Pub. Date: Feb. 10, 2022

(65) Prior Publication Data
US 2023/0306050 A1    Sep. 28, 2023

(51) Int. Cl.
*G06F 17/00*   (2019.01)
*G06F 16/35*   (2019.01)
(Continued)

(52) U.S. Cl.
CPC ............ *G06F 16/35* (2019.01); *G06F 40/284* (2020.01); *G06F 40/40* (2020.01)

(58) Field of Classification Search
None
See application file for complete search history.

(56) References Cited

U.S. PATENT DOCUMENTS 11,042,700 B1 *  6/2021  Walters ............... G06F 40/169
2019/0236464 A1 *  8/2019  Feinson ............... G06N 3/006
(Continued)

OTHER PUBLICATIONS

Search Report for International Application No. PCT/EP20210/072039, 12 pages, Apr. 26, 2021
(Continued)

*Primary Examiner* — Satwant K Singh
(74) *Attorney, Agent, or Firm* — Slayden Grubert Beard PLLC

(57) ABSTRACT

Various embodiments of the teachings herein include a computer-implemented method of fine-tuning Natural Language Processing (NLP) models. Some examples include: providing a training data set including a multitude of training text documents; providing a NLP model including a Neural Network (NN) based Topic Model (TM) having scalable TM parameters and a parallel large-scale pre-trained Language Model (LM) having scalable LM parameters; and fine-tuning the NLP model by jointly training the NN-based TM and the parallel large-scale pre-trained LM using a projected vector comprising a combination and projection of a document topic proportion generated by the NN-based TM based on the scalable TM parameters from an input training text document of the multitude of training text documents, and of a contextualized document representation generated by the large-scale pre-trained LM based on the scalable LM parameters from the same input training text document.

3 Claims, 6 Drawing Sheets

(51) Int. Cl.
  *G06F 40/284* (2020.01)
  *G06F 40/40* (2020.01)

(56) References Cited

U.S. PATENT DOCUMENTS

| | | | |
|---|---|---|---|
| 2019/0325066 A1* | 10/2019 | Krishna | G06N 20/00 |
| 2019/0370331 A1 | 12/2019 | Büttmer | G06N 17/2785 |
| 2020/0184339 A1 | 6/2020 | Li | G06N 3/084 |
| 2021/0248192 A1* | 8/2021 | Lu | G06F 40/284 |
| 2021/0326523 A1* | 10/2021 | Walters | G06F 16/345 |
| 2022/0129724 A1* | 4/2022 | Feinson | G06N 3/006 |

OTHER PUBLICATIONS

Miao Yishu, Lei Yu and Phil Blunsom. "Neural Variational Inference for Text Processing." ICML, 2016.

Ashish Vaswani et al. "Attention is all you need." In Advances in Neural Information Processing Systems, 2017.

Yatin, Chaudhary et al: "TopicBERT for Energy Efficient Document Classification"; arxiv.org, Cornell University Library; 201 Olin Library Cornell University Ithaca; NY 14853; XP081803199; Oct. 15, 2020.

CNN: Kim et al. (Yoon Kim. 2014. Convolutional neural net-works for sentence classification. In Proceedings of the 2014 Conference on Empirical Methods in Natural Language Processing, EMNLP, Doha, Qatar, A meeting of SIGDAT, a Special Interest Group of the ACL, Oct. 25, 2014.

Chi Sun et al: "How to Fine-Tune BERT for Text Classification?"; ARXIV.Org, Cornell University Library; 201; Olin Library Cornell University Ithaca; NY; 1485; XP081592483; May 14, 2019.

Federico, Bianchi et al: "Pre-training is a Hot Topic: Contextualized Document Embeddings Improve Topic Coherence"; ARXIV.Org; Cornell University Library; 201 Olin Library Cornell University Ithaca; NY; 14853; XP081640251; Apr. 8, 2020.

Jacob Devlin et al, "BERT: Pre-training of Deep Didirectional Transformers for Language Understanding" NAACL 2019; Proceedings of NAACL-HLT 2019, pp. 4171-4186 Minneapolis, Minnesota. Association for Computational Linguistics; Jun. 2, 2019.

Zhou, Yujun et al: "Pre-trained Contextualized Representation for Chinese Conversation Topic Classification"; 2019 IEEE International Conference on Intelligence and Security Informatics (ISI); pp. 122-127; XP033611985; DOI: 10.1109/ISI.2019.8823172; Jul. 1, 2019.

Rogers et al. (Anna Rogers, Olga Kovaleva, Anna Rumshisky. A Primer in BERTology: What we know about how BERT works), 2020.

Arman, Cohan et al: "Document-level Representation Learning using Citation-informed Transformers"; arxiv.org; Cornell University Library; 201 Olin Library Cornell University Ithaca; NY 14853; XP081644943; Apr. 15, 2020.

Alexandre Lacoste et al. Quantifying the carbon emissions of machine learning. arXiv preprint arXiv:1910.09700, 2019.

Peinelt Nicole et al: "tBERT: Topic Models and BERT Joining Forces for Semantic Similarity Detection"; Proceedings of the 58th Annual Meeting of the Association for Computational Linguistics; pp. 7047-7055; Jul. 1, 2020.

\* cited by examiner

FIG 8

| #Instances | #batch | Sequence length | CC | T (fine-tuning) |
|---|---|---|---|---|
| 512 → i | b | n | $O(n^2 d)$ | $O(n^2 di)$ |
| 256 → 2i | 2b | n/2 | $O(n^2 d/4)$ | $O(n^2 di/2)$ |
| 128 → 4i | 4b | n/4 | $O(n^2 d/16)$ | $O(n^2 di/4)$ |
| 64 → 8i | 8b | n/8 | $O(n^2 d/64)$ | $O(n^2 di/8)$ |

FIG 9

| | Models | Reuters8 | | | | | Imdb | | | | |
|---|---|---|---|---|---|---|---|---|---|---|---|
| | | F1 | Rtn | $T_{epoch}$ | T | $CO_2$ | F1 | Rtn | $T_{epoch}$ | T | $CO_2$ |
| baselines | CNN | 0.852±0.000 | 91.123% | 0.007 | 0.340 | 14.51 | 0.884±0.000 | 94.952% | 0.201 | 2.010 | 85.83 |
| | Log-BERTemb-CLS | 0.732±0.000 | 78.289% | – | 0.013 | 0.56 | 0.823±0.000 | 88.399% | – | 0.079 | 3.37 |
| | Log-BERTemb-AVG | 0.882±0.000 | 94.331% | – | 0.010 | 0.47 | 0.883±0.000 | 94.844% | – | 0.077 | 3.29 |
| | Log-BERTemb-AVG+LTF | 0.867±0.000 | 92.727% | – | 0.015 | 0.68 | 0.894±0.000 | 96.026% | – | 0.114 | 4.87 |
| | BERT-x | 0.935±0.012 | 100.00% | 0.208 | 3.123 | 133.34 | 0.931±0.002 | 100.00% | 0.984 | 14.755 | 630.4 |
| proposal | TopicBERT-512 | 0.950±0.005 | 101.60% | 0.212 | 3.183 | 135.93 | 0.934±0.002 | 100.32% | 1.017 | 15.251 | 651.22 |
| | TopicBERT-256 | 0.942±0.009 | 100.74% | 0.125 | 1.870 | 79.85 | 0.936±0.002 | 100.53% | 0.789 | 11.838 | 505.46 |
| | TopicBERT-128 | 0.928±0.015 | 99.251% | 0.107 | 1.610 | 68.76 | 0.928±0.002 | 99.677% | 0.890 | 13.353 | 570.17 |
| | TopicBERT-64 | 0.921±0.006 | 98.502% | 0.130 | 1.956 | 83.51 | 0.909±0.015 | 97.636% | 1.164 | 17.461 | 745.60 |
| | Gain (performance) | ↑1.604% | – | – | – | – | ↑0.537% | – | – | – | – |
| | Gain (efficiency)) | | 99.251% | ↓1.9x | ↓1.9x | ↓1.9x | – | 100.53% | ↓1.2x | ↓1.2x | ↓1.2x |

| | Models | 20NS | | | | | Ohsumed | | | | |
|---|---|---|---|---|---|---|---|---|---|---|---|
| | | F1 | Rtn | $T_{epoch}$ | T | $CO_2$ | F1 | Rtn | $T_{epoch}$ | T | $CO_2$ |
| baselines | CNN | 0.786±0.000 | 95.504% | 0.109 | 1.751 | 74.76 | 0.684±0.000 | 89.179% | 0.177 | 7.090 | 302.74 |
| | Log-BERTemb-CLS | 0.484±0.000 | 58.809% | – | 0.039 | 1.67 | 0.205±0.000 | 26.727% | – | 0.087 | 3.72 |
| | Log-BERTemb-AVG | 0.692±0.000 | 84.083% | – | 0.037 | 1.58 | 0.453±0.000 | 59.061% | – | 0.094 | 4.01 |
| | Log-BERTemb-AVG+LTF | 0.731±0.000 | 88.821% | – | 0.051 | 2.18 | 0.543±0.000 | 70.795% | – | 0.191 | 8.16 |
| | BERT-x | 0.823±0.007 | 100.00% | 0.495 | 7.430 | 317.28 | 0.767±0.002 | 100.00% | 1.096 | 16.442 | 702.07 |
| proposal | TopicBERT-512 | 0.826±0.004 | 100.36% | 0.507 | 7.606 | 324.76 | 0.769±0.005 | 100.26% | 1.069 | 16.036 | 684.75 |
| | TopicBERT-256 | 0.823±0.016 | 100.00% | 0.400 | 5.993 | 255.90 | 0.761±0.001 | 99.217% | 0.902 | 13.530 | 577.73 |
| | TopicBERT-128 | 0.826±0.004 | 100.36% | 0.444 | 6.666 | 284.64 | 0.739±0.006 | 96.349% | 1.003 | 15.047 | 642.50 |
| | TopicBERT-64 | 0.830±0.002 | 100.85% | 0.605 | 9.079 | 387.66 | 0.711±0.003 | 92.698% | 1.334 | 20.008 | 854.34 |
| | Gain (performance) | ↑0.850% | – | – | – | – | ↑0.260% | – | – | – | – |
| | Gain (efficiency)) | | 100.00% | ↓1.2x | ↓1.2x | ↓1.2x | – | 99.217% | ↓1.2x | ↓1.2x | ↓1.2x |

| | Models | AGnews | | | | | | | | | |
|---|---|---|---|---|---|---|---|---|---|---|---|
| | | F1 | Rtn | $T_{epoch}$ | T | $CO_2$ | F1 | Rtn | T | T | $CO_2$ |
| baselines | CNN | 0.916±0.000 | 97.447% | 0.131 | 0.921 | 393.25 | | | | | |
| | Log-BERTemb-CLS | 0.875±0.000 | 93.085% | – | 0.072 | 3.07 | | | | | |
| | Log-BERTemb-AVG | 0.903±0.000 | 96.064% | – | 0.075 | 3.20 | | | | | |
| | Log-BERTemb-AVG+LTF | 0.913±0.000 | 97.128% | – | 0.105 | 4.48 | | | | | |
| | BERT-x | 0.940±0.001 | 100.00% | 0.952 | 14.281 | 609.80 | | | | | |
| proposal | TopicBERT-512 | – | – | – | – | – | | | | | |
| | TopicBERT-256 | – | – | – | – | – | | | | | |
| | TopicBERT-128 | 0.942±0.003 | 100.21% | 1.004 | 15.065 | 643.27 | | | | | |
| | TopicBERT-64 | 0.943±0.002 | 100.31% | 0.723 | 10.838 | 462.78 | | | | | |
| | TopicBERT-32 | 0.938±0.001 | 99.78% | 0.846 | 12.688 | 541.66 | | | | | |
| | Gain (performance) | ↑0.319% | – | – | – | – | | | | | |
| | Gain (efficiency)) | – | 100.31% | ↓1.3x | ↓1.3x | ↓1.3x | | | | | |

FIG 10

| Hyperparameter (NVDM) | Value |
|---:|:---|
| learning rate | 0.001 |
| hidden size | 256 |
| batch size | 64 |
| activation | sigmoid |
| number of samples | 10 |
| number of topics | [50, 100, 200] |

FIG 11

| Hyperparameter (BERT) | Value |
|---:|:---|
| learning rate | 2e-5 |
| hidden size | 768 |
| batch size | [4, 32] |
| activation | gelu |
| initializer range | 0.02 |
| number of samples | 10 |
| maximum sequence length | [512, 256, 128, 64, 32] |
| number of attention heads | 12 |
| number of hidden layers | 12 |
| vocab size | 28996 |
| dropout probability | 0.1 |
| topic loss fraction ($\alpha$)* | [0.1, 0.5, 0.9] |
| projection size* | 768 |

DECARBONIZING BERT WITH TOPICS FOR EFFICIENT DOCUMENT CLASSIFICATION

CROSS-REFERENCE TO RELATED APPLICATIONS

This application is a U.S. National Stage Application of International Application No. PCT/EP2020/072039 filed Aug. 5, 2020, which designates the United States of America, the contents of which are hereby incorporated by reference in their entirety.

TECHNICAL FIELD

The present disclosure relates to Natural Language Processing (NPL). Various embodiments of the teachings herein include computer-implemented methods of fine-tuning NLP models and/or data processing systems for hosting NLP models.

BACKGROUND

Transfer learning with large-scale pre-trained Language Models (LMs) (e.g. BERT, Transformers, ELMo, etc.) has recently achieved success in improving performance on downstream natural language processing tasks. The large-scale pre-trained LMs come with an excessive high cost in terms of computational time, GPU/TPU memory constraints and longer training time. Recent works have addressed the high computation cost of pre-training large-scale LMs via distillation, which reduces the model size while the performance is retained. However, this approach is only effective in pre-training of large-scale LMs, as only during pre-training the computation cost is reduced.

In fine-tuning of pre-trained (e.g. with distillation) large-scale LMs computation cost grows quadratic with text sequence lengths. Consequently, in fine-tuning pre-trained large-scale LMs for long-sequence downstream tasks, such as document classification, the computation cost remains extremely high. Further, the performance of fine-tuned large-scale LMs can still be increased, as, despite high performance results, in particular, in classification tasks, fine-tuned large-scale LMs do not achieve 100% [Percent] correct predictions, yet.

SUMMARY

Accordingly, the teachings of the present disclosure may overcome or at least alleviate these problems. For example, some embodiments of the teachings herein include a computer-implemented method of fine-tuning Natural Language Processing (NLP) models comprising: providing (S1) at least one training data set including a multitude of training text documents (5); providing (S2) a NLP model (1) including a Neural Network, NN, based Topic Model, TM, (2) having scalable TM parameters and a parallel large-scale pre-trained Language Model, LM, (3) having scalable LM parameters; fine-tuning (S3) the NLP model (1) by jointly training the NN-based TM (2) and the parallel large-scale pre-trained LM (3) based on a projected vector ($h_p$) that is a combination and projection of a document topic proportion ($h_{TM}$), which is generated by the NN-based TM (2) based on its scalable TM parameters from an input training text document (5) of the multitude of training text documents, and of a contextualized document representation ($o_{CLS}$), which is generated by the large-scale pre-trained LM (3) based on its scalable LM parameters from the same input training text document (5).

In some embodiments, the contextualized document representation ($o_{CLS}$) is generated by the large-scale pre-trained LM from an input decreased sequence (5') of the same training text document (5).

In some embodiments, the provided NLP model (1) further includes at least one downstream processing layer (4) having scalable processing parameters, and in the step of fine-tuning (S3) the NN-based TM (2) and the parallel large-scale pre-trained LM (3) as well as the at least one downstream processing layer (4) are jointly trained, while the projected vector ($h_p$) is input to the at least one processing layer (4).

In some embodiments, the step of fine-tuning (S3) comprises for each training text document of at least a sub-set of the provided at least one training data set includes iteratively: inputting (S31) one training text document (5) of the multitude of training text documents to the NN-based TM (2) and to the parallel large-scale pre-trained LM (3); generating (S32) a document topic proportion ($h_{TM}$) and a TM output vector ($\hat{x}$), which is based on the document topic proportion ($h_{TM}$), from the input training text document (5) by the NN-based TM (2) based on its scalable TM parameters; generating (S33) a contextualized document representation ($o_{CLS}$) from the same input training text document (5) or a decreased fraction thereof by the large-scale pre-trained LM (3) based on its scalable LM parameters; combining and projecting (S34) the generated document topic proportion ($h_{TM}$) and the generated contextualized document representation ($o_{CLS}$) into the projected vector ($h_p$); generating (S35) a processed output vector (y) from the projected vector ($h_p$) by the at least one processing layer (4) based on its scalable processing parameters; combining (S36) an TM objective function ($L_{TM}$), which is based on the TM output vector ($\hat{x}$) of the NN-based TM (2), and an LM objective function ($L_{BERT}$), which is based on the processed output vector (y) of the at least one processing layer (4), into a joint objective function ($L_{TopicBERT}$); updating (S37) the scalable TM parameters of the NN-based TM (2), the scalable LM parameters of the large-scale pre-trained LM (3), and the scalable processing parameters of the at least one processing layer (4) based on the joint objective function ($L_{TopicBERT}$).

In some embodiments, the NN-based TM (2) is a Neural Variational Document Model, NVDM, and additionally or alternatively the large-scale pre-trained LM (3) is a Bidirectional Encoder Representations from Transformers, BERT, model, and additionally or alternatively the at least one processing layer (4) is at least one classification layer.

As another example, some embodiments include a data processing system (10) for hosting Natural Language Processing, NLP, models, comprising: means (11, 12) implementing a NLP model (1) including a Neural Network, NN, based Topic Model, TM, (2) and a parallel large-scale pre-trained Language Model, LM, (3), the NN-based TM (2) comprising scalable TM parameters and configured to generate a document topic proportion ($h_{TM}$) and an TM output vector ($\hat{x}$), which is based on the document topic proportion ($h_{TM}$), from an input text document based on its scalable TM parameters, the large-scale pre-trained LM (3) comprising scalable LM parameters and configured to generate a contextualized document representation ($o_{CLS}$) from the same input text document based on its scalable LM parameters, wherein the NLP model is configured to derive a projected vector ($h_p$), which is a combination and projection of the document topic proportion ($h_{TM}$) and the contextualized document representation ($o_{CLS}$).

In some embodiments, the NLP model (1) further includes at least one downstream processing layer (4), the at least one processing layer (4) comprising scalable processing parameters and configured to generate a processed output vector (y), which is based on the projected vector ($h_p$).

In some embodiments, the NN-based TM (2) is a Neural Variational Document Model, NVDM, and additionally or alternatively the large-scale pre-trained LM (3) is a Bidirectional Encoder Representations from Transformers, BERT, model, and additionally or alternatively the at least one processing layer (4) is at least one classification layer.

In some embodiments, the means (11, 12) carry out the steps of one or more of the computer-implemented methods described herein.

As another example, some embodiments include a computer program comprising instructions which, when the program is executed by a computer, cause the computer to carry out the steps of one or more of the methods described herein.

As another example, some embodiments include a computer-readable medium (20) having stored thereon one or more computer programs as described herein.

BRIEF DESCRIPTION OF THE DRAWINGS

The teachings herein are explained in further detail by exemplary embodiments shown in the drawings. The exemplary embodiments only conduce better understanding of the present invention and in no case are to be construed as limiting for the scope of the present disclosure. Particularly, it is possible to extract aspects of the subject-matter described in the figures and to combine it with other components and findings of the present description or figures, if not explicitly described differently. Equal reference signs refer to the same objects, such that explanations from other figures may be supplementally used.

FIG. 8 shows a table of fine-tuning times for different sequence lengths of the input decreased sequence of the input training text document incorporating teachings of the present disclosure;

FIG. 9 shows a table with experimental results; and

FIGS. 10 and 11 show hyper-parameters of the NVDM and BERT model used during experimentation.

DETAILED DESCRIPTION

Figure 1:
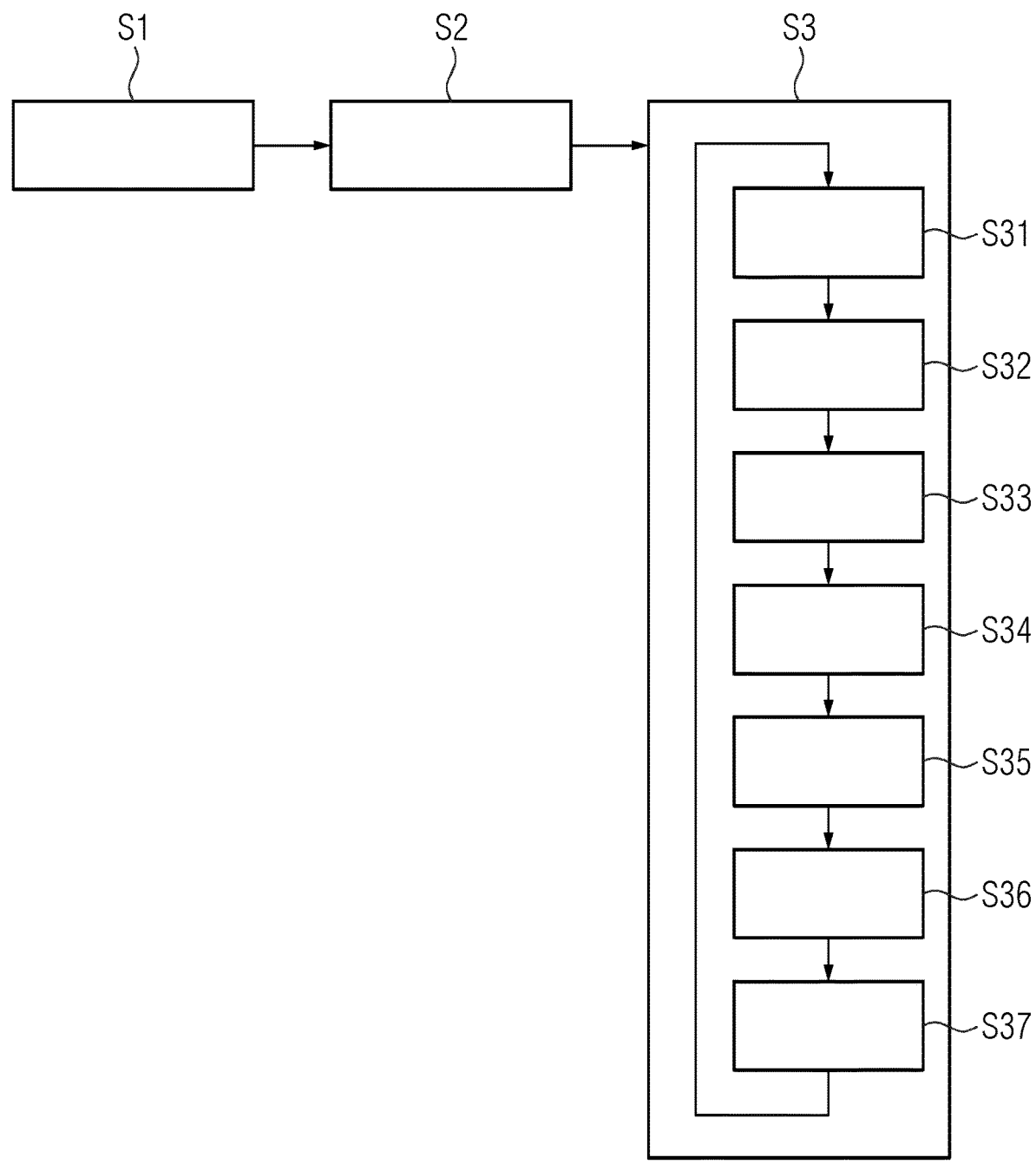
FIG. 1 shows a schematic flow chart of an example embodiment of the computer-implemented method of fine-tuning a NLP model incorporating teachings of the present disclosure and of the corresponding computer program.

The teachings of the present disclosure include a computer-implemented method of fine-tuning Natural Language Processing (NLP) models, comprising:
Providing at least one training data multitude of training text documents.
Providing a NLP model. The NLP model includes a Neural Network (NN) based Topic Model (TM) having scalable TM parameters and a parallel large-scale pre-trained Language Model (LM) having scalable LM parameters.
Fine-tuning the NLP model by jointly training the NN-based TM and the parallel large-scale pre-trained LM based on a projected vector ($h_p$). The projected vector ($h_p$) is a combination and projection of a document topic proportion ($h_{TM}$) and of a contextualized document representation ($o_{CLS}$). The document topic proportion ($h_{TM}$) is generated by the NN-based TM based on its scalable TM parameters from an input training text document of the multitude of training text documents. The contextualized document representation ($o_{CLS}$) is generated by the large-scale pre-trained LM based on its scalable LM parameters from the same input training text document.

Another example embodiment includes a data processing system for hosting Natural Language Processing, NLP, models, comprises means implementing a NLP model. The NLP model includes a Neural Network (NN) based Topic Model™ and a parallel large-scale pre-trained Language Model (LM). The NN-based TM comprises scalable TM parameters. The NN-based TM is configured to generate a document topic proportion ($h_{TM}$) and an TM output vector ($\hat{x}$), which is based on the document topic proportion ($h_{TM}$), from an input text document based on its scalable TM parameters. The large-scale pre-trained LM comprises scalable LM parameters. The large-scale pre-trained LM is configured to generate a contextualized document representation ($o_{CLS}$) from the same input text document based on its scalable LM parameters. The NLP model is configured to derive a projected vector ($h_p$), which is a combination and projection of the document topic proportion ($h_{TM}$) and the contextualized document representation ($o_{CLS}$).

Some embodiments include a computer program comprising instructions which, when the program is executed by a computer, cause the computer to carry out one or more of the methods described herein.

Some embodiments include a computer-readable medium storing a computer program as described herein.

The teachings of the present disclosure include optimizing fine-tuning NLP models including large-scale pre-trained LMs for long-sequence downstream tasks such as document classification without distillation. Thereto, complementary learning of TMs and LMs is exploited in a novel joint framework that is named as "TopicBERT". In the NLP model (i.e. TopicBERT model) according to the present invention the NN-based TM captures topics of the input text documents and the large-scale pre-trained LM (e.g. BERT model) encodes contexts of the input text documents. Thereby, the information extracted by the NN-based TM and the information extracted by the large-scale pre-trained LM complement one another, such that performance of the fine-tuned NLP model is further increased.

The NN-based TM and the large-scale pre-trained TM may include models based on Machine Learning Algorithms (MLAs). MLAs are algorithms that improve a performance automatically through experience or training. They build a model based on sample data, known as training data or training samples, in order to make predictions or decisions without being explicitly programmed to do so. Machine Learning (ML) involves creating a model, which is trained on some training data and then can process input data to make predictions. A MLA may implement an Artificial Neural Network (ANN or just Neural Network, NN), a decision tree, a Support Vector Machine (SVM), a regression analysis, a Bayesian network, a genetic algorithm and the like.

For example, (A)NNs are systems, in particular computing systems, inspired by biological neural networks that constitute animal brains. ANNs "learn" to perform tasks by considering (labelled) examples or training data, generally without being designed with any task-specific rules. During an initial learning or training phase ANNs automatically generate identifying characteristics from the (labelled) training data. ANNs comprise a collection of connected nodes called artificial neurons, which loosely model the neurons in a biological brain. Each connection (synapses in the biological brain) can transmit a signal from one node to another. A node that receives a signal can process it and then signal to subsequent neurons connected to it. In common ANN implementations, the signal at a connection between nodes is a real number (e.g. 0 . . . 1), and the output of each artificial neuron is computed by some non-linear function of the sum of its inputs (from other nodes). The connections between nodes are called "edges". The edges in ANNs may each have a weight that is adjusted during training of the ANNs. The weight increases or decreases the strength of the signal at the corresponding edge. Nodes may each have a threshold such that the signal is only sent if an aggregate signal exceeds that threshold. Typically, nodes are aggregated into layers. Different layers may perform different kinds of transformations on their inputs. Signals travel from a first layer or input layer to a last layer or output layer, possibly after traversing the layers multiple times.

In other words, an (A)NN is a network of basic elements, the so called nodes or artificial neurons, which receive input. After receiving input, the nodes change their internal state (activation) according to that input, and produce output depending on the input and activation. The network forms by connecting the output of certain nodes to the input of other nodes forming a directed, weighted graph. The weights as well as the functions that compute the activation of each node can be modified during initial learning/training, which is governed by a learning rule or paradigm.

A node receiving an input from at least one predecessor neuron consists of the following components: an activation, the node's state, depending on a discrete time parameter, optionally a threshold, which stays fixed unless changed by a learning/training function, an activation function (e.g. hyperbolic tangent function, sigmoid function, softmax function, rectifier function etc.) that computes the new activation at a given time and the net input and an output function computing the output from the activation (often the output function is the identity function). An important characteristic of the activation function is that it provides a smooth transition as input values change, i.e. a small change in input produces a small change in output.

An input node has no predecessor but serves as input interface for the whole ANN. Similarly, an output node has no successor and thus serves as output interface of the whole ANN. An ANN consists of edges/connections, each edge transferring the output of a node (predecessor) to the input of another, succeeding node (successor). Additionally, to the assigned weight an edge may have a bias term added to a total weighted sum of inputs to serve as a threshold to shift the activation function. The propagation function computes the input to the succeeding node (successor) from the outputs of preceding nodes (predecessors) and may include the bias value.

The deep NN comprises more than one layer, e.g. more than four layers, or more than seven layers and/or ten or more layers. Each layer may comprise several neurons or nodes. Preferably each layer may contain ten or more, 50 or more, and/or 100 or more neurons.

A core objective of a MLA, of a learner, is to generalize from its experience. Generalization in this context is the ability of a MLA to perform accurately on new, unseen examples/tasks. i.e. input data, after having experienced one or more learning data sets. The training examples of the training data sets come from some generally unknown probability distribution (considered representative of the space of occurrences) and the learner/MLA has to build a general model about this space that enables it to produce sufficiently accurate predictions in new cases. The types of machine learning algorithms differ in their approach, the type of data they input and output, and the type of task or problem that they are intended to solve.

In particular, a learning or training rule or paradigm may be an algorithm which modifies the parameters of a respective MLA, in order for a given input to the MLA to produce a favoured output. This training typically amounts to modifying the scalable parameters of the MLA, for example, the weights and thresholds of the variables within an ANN. Given a specific task to solve and a class of functions, learning means use a set of observations to find the one function of the class of functions which solves the task in some optimal sense. This entails defining a cost function such that for the optimal solution the cost is minimal and no other solution has a cost less than the cost of the optimal solution. The cost function is an important concept in learning, as it is a measure of how far away a particular solution is from an optimal solution to the problem to be solved. Learning algorithms search through the solution space to find a function that has the smallest possible cost. For applications where the solution is data dependent, the cost must necessarily be a function of the observations, otherwise the model would not relate to the data. It is frequently defined as a statistic to which only approximations can be made. It is possible to define an arbitrary cost function, however, a particular cost function may be used either because it has desirable properties (e.g. convexity) or because it arises naturally from a particular formulation of the problem.

For example, an ANN can be discriminatively trained with a standard backpropagation algorithm. Backpropagation is a method to calculate the gradient of a loss function (produces the cost associated with a given state) with respect to the weights in the ANN. The weight updates of backpropagation can be done via stochastic gradient descent. The choice of the cost function depends on factors such as the learning type (e.g. supervised, unsupervised, reinforcement etc.) and the activation function. Commonly, the activation function and cost function are the softmax function and cross entropy function, respectively.

In other words, training an ANN essentially means selecting one model from the set of allowed models (or, in a Bayesian framework, determining a distribution over the set of allowed models) that minimizes the cost. Commonly some form of gradient descent is deployed, using backpropagation to compute the actual gradients. This is done by simply taking the derivative of the cost function with respect to the network parameters and then changing those parameters in a gradient-related direction. Backpropagation training algorithms fall into three categories: steepest descent (with variable learning rate and momentum, resilient backpropagation), quasi-Newton (Broyden-Fletcher-Goldfarb-Shanno, one step secant), Levenberg-Marquardt and conjugate gradient (Fletcher-Reeves update, Polak-Ribiere update, Powell-Beale restart, scaled conjugate gradient).

Common training paradigms include, for example, supervised learning, unsupervised learning and reinforcement learning.

Supervised learning algorithms build a mathematical model of a set of data that contains both the inputs and the desired outputs (labels). The training data comprises of a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function (L), supervised learning algorithms learn a function that can be used to predict the output associated with new inputs. An optimal function will allow the algorithm to correctly determine the output for inputs that were not a part of the training data. Supervised learning uses a set of example pairs and the aim is to find a function in the allowed class of functions that matches the examples. In other words, the mapping implied by the data is inferred; the cost function is related to the mismatch between the mapping of the model e.g. the ANN and the data and it implicitly contains prior knowledge about the problem domain. The cost may be the mean-squared error, which tries to minimize the average squared error between the MLA's/ANN's output and a target value over all the example pairs. For example, minimizing this cost using gradient descent for the class of ANNs called multilayer perceptrons (MLP) produces the backpropagation algorithm for training ANNs.

Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data. In unsupervised learning, some data is given and the cost function to be minimized that can be any function of the data and the MLA's/ANN's output. The cost function is dependent on the task and any a priori assumptions (e.g. implicit properties or parameters of the model, observed variables etc.).

Reinforcement learning is an area of machine learning concerned with how software agents ought to take actions in an environment so as to maximize some notion of cumulative reward. In machine learning, the environment is typically represented as a Markov Decision Process (MDP). Reinforcement learning algorithms do not assume knowledge of an exact mathematical model of the MDP, and are used when exact models are infeasible. For example, reinforcement learning algorithms are used in autonomous vehicles or in learning to play a game against a human opponent. As in reinforcement learning, data is usually not given, it is instead generated by an agent's interactions with the environment. At each point in time the agent performs an action and the environment generates an observation and an instantaneous cost according to some (usually unknown) dynamics. The aim is to discover a policy for selecting actions that minimizes some measure of a long-term cost, e.g. the expected cumulative cost. The environment's dynamics and the long-term cost for each policy are usually unknown, but may also be estimated. The environment is commonly modelled as MDP with states and actions with the following probability distributions: the instantaneous cost distribution, the observation distribution and the transition, while a policy is defined as the conditional distribution over actions given the observations. Taken together, the two then define a Markov chain (MC). The aim is to discover the policy (i.e., the MC) that minimizes the cost.

In the present disclosure, the training data set comprises the multitude of training text documents. The training text documents are long sequences of words, in particular, text documents comprising 512 or more words. Further, the training text documents may be tender documents. Tender documents contain a mixture of topics from several domains, therefore the need for complementary learning in document classification leveraging both language model and topic model. The training data set may further comprise corresponding labels for each training text document. The labels represent the ground truth against which the results of the NLP model are compared during training, i.e. via the respective objective function.

The NLP model has a parallel structure. The NN based TM is arranged in parallel to the large-scale pre-trained LM. Thus, an input text document is provided to the NN based TM and in parallel to the large-scale pre-trained LM.

The scalable TM parameters of the NN-based TM can be updated during fine-tuning, i.e. training, of the NLP model based on the respective objective function. Based on the scalable TM parameters the document topic proportion ($h_{TM}$) and also the TM output vector ($\hat{x}$), which is derived from the document topic proportion ($h_{TM}$), are generated from an input text document (e.g. a training text document during fine-tuning) by the NN-based TM. The document topic proportion ($h_{TM}$) contains topical information about the input (training) text document.

The scalable LM parameters of the large-scale pre-trained LM can be updated during fine-tuning, i.e. training, of the NLP model based on the same respective objective function. Based on the scalable LM parameters the contextualized document representation ($o_{CLS}$) is generated from an input text document (e.g. a training text document during fine-tuning) by the large-scale pre-trained LM. The contextualized document representation ($o_{CLS}$) contains context information about the input (training) text document.

During training of the NLP model the NN-based TM and the large-scale pre-trained LM are trained jointly, namely in parallel. Both receive the same training text document from the training data set and generate each their respective output therefrom. Thereby, the NN-based TM and the large-scale pre-trained LM are each trained based on the projected vector ($h_p$). In other words, the respective scalable parameters of both are updated based on the projected vector ($h_p$). The projected vector ($h_p$) combines the latent features (output or state of the last layer) of the NN-based TM, i.e. the document topic proportion ($h_{TM}$), and the (first) output vector of the large-scale pre-trained LM, i.e. the contextualized document representation ($o_{CLS}$), which are both based on the same input training text document.

The projected vector ($h_p$) may be a concatenation and projection or a (weighted) linear combination and projection of the of the document topic proportion ($h_{TM}$) and the contextualized document representation ($o_{CLS}$). The projected vector ($h_p$) contains merged topical information and context information about the input (training) text document. In particular, the projected vector ($h_p$) may be as:

$$h_p = o_{CLS} \oplus h_{TM},$$

where $\oplus$ represents concatenation.

The fine-tuning yields a fine-tuned NLP model that exploits the merged information of the NN-based TM and of the large-scale pre-trained LM. Thus, the performance of a NLP-model fine-tuned incorporating teachings of the present disclosure is higher than the performance of common fine-tuned large-scale LMs. The teachings herein offer improving classification performance of complex text documents like tender documents or long-sequence text documents.

In some embodiments, the contextualized document representation ($o_{CLS}$) is generated by the large-scale pre-trained LM from an input decreased sequence of the same training text document. Instead of the complete training text document only the decreased sequence, preferably a fraction of the training text document is input to the large-scale pre-trained LM. The large-scale pre-trained LM generates the contextualized document representation ($o_{CLS}$) based on its scalable LM parameters from this decreased sequence/fraction of the training text document, which is still completely input to the NN-based TM in parallel.

This refinement focuses on optimizing computation cost in fine-tuning NLP models including large-scale pre-trained LMs for long-sequence downstream tasks such as document classification without distillation, because computation cost of fine-tuning grows quadratic with text sequence lengths. Thereto, the complementary learning of the NN-based TM and large-scale pre-trained LM is further adapted. NN-based TM still captures topics of the complete input text documents while the large-scale pre-trained LM encodes contexts of the input text documents based on decreased sequences. In other words, only a part (sub-string, fraction) of the input (training) text document is used as input for the large-scale pre-trained LM. Thereby, the computation cost of the large-scale pre-trained LM in fine-tuning is significantly reduced due to the reduced sequence length of the input. However, with full access to document-level context provided by the document-topic representation of the NN-based TM in complementary learning, the performance of the fine-tuned NLP model remains comparable to common fine-tuned large-scale LMs. Yet a significant speedup of the fine-tuning process is achieved. Further, as the training time or computation cost for fine-tuning correlates with the Carbon dioxide ($CO_2$) emission, additionally to the reduced time for fine-tuning the NLP model the $CO_2$ emission generated during fine-tuning is significantly reduced, too. The present invention offers reducing longer training time, reducing CO2 emission and reducing compute budget, which is particularly favorable in productive environments for batch training.

In some embodiments, the provided NLP model further includes at least one downstream processing layer having scalable processing parameters. In the step of fine-tuning the NN-based TM and the parallel large-scale pre-trained LM as well as the at least one downstream processing layer are jointly trained, while the projected vector is input to the at least one processing layer.

In some embodiments, the NLP model further includes at least one downstream processing layer. The at least one processing layer comprises scalable processing parameters. The at least one processing layer is configured to generate a processed output vector (y), which is based on the projected vector ($h_p$). Downstream of the parallel structure comprising the NN based TM and the large-scale pre-trained LM the NLP model comprises the at least one processing layer. A (training) text document is first input in parallel to the NN based TM and the large-scale pre-trained LM the NLP model. The generated document topic proportion ($h_{TM}$) and the contextualized document representation ($o_{CLS}$) are combined and projected into the projected vector ($h_p$) which is input to the at least one processing layer.

The at least one processing layer may be at least one classification layer, feature aggregation layer, feature representation layer, etc. The scalable processing parameters of the at least one processing layer can be updated during fine-tuning, i.e. training, of the NLP model based on the respective objective function. Based on the scalable processing parameters the processed output vector (y) is generated from the input the projected vector ($h_p$) by the at least one processing layer.

During training of the NLP model the NN-based TM and the large-scale pre-trained LM are trained in parallel and jointly with the at least one downstream processing layer (end-to-end). After the NN-based TM and the large-scale pre-trained LM received the same training text document from the training data set and generated each their respective output therefrom, the projected vector ($h_p$) is derived from the document topic proportion ($h_{TM}$) and the contextualized document representation ($o_{CLS}$). Thereby, the NN-based TM and the large-scale pre-trained LM as well as the at least one processing layer are each trained based on the projected vector ($h_p$) and based on the processed output vector (y) of the at least one processing layer. In other words, the respective scalable parameters of all three are updated based on the projected vector ($h_p$) and the processed output vector (y). Thus, the NLP model with at least one processing layer can be fine-tuned for processing a (long sequence) text document with better performance and additionally or alternatively in shorter training time than common NLPs including s fine-tuned large-scale LM and at least one processing layer.

In some embodiments, the step of fine-tuning comprises for each training text document of at least a sub-set of the provided at least one training data set the following iterative steps:

Inputting one training text document of the multitude of training text documents to the NN-based TM and to the parallel large-scale pre-trained LM.

Generating a document topic proportion ($h_{TM}$) and a TM output vector ($\hat{x}$), which is based on the document topic proportion ($h_{TM}$), from the input training text document by the NN-based TM based on its scalable TM parameters.

Generating a contextualized document representation ($o_{CLS}$) from the same input training text document or a decreased fraction thereof by the large-scale pre-trained LM based on its scalable LM parameters.

Combining and projecting the generated document topic proportion ($h_{TM}$) and the generated contextualized document representation ($o_{CLS}$) into the projected vector ($h_p$).

Generating a processed output vector (y) from the projected vector ($h_p$) by the at least one processing layer (4) based on its scalable processing parameters.

Combining a TM objective function ($L_{TM}$), which is based on the TM output vector ($\hat{x}$) of the NN-based TM, and an LM objective function ($L_{BERT}$), which is based on the processed output vector (y) of the at least one processing layer, into a joint objective function ($L_{TopicBERT}$).

Updating the scalable TM parameters of the NN-based TM, the scalable LM parameters of the large-scale pre-trained LM, and the scalable processing parameters of the at least one processing layer based on the joint objective function ($L_{TopicBERT}$).

The iterative steps may be executed for each of the input training text documents until a predefined stop criterion (e.g. convergence, maximal number of iterations, etc.) is fulfilled.

Instead of whole training text documents only a decreased sequence or fraction of the training text documents may be input to the large-scale pre-trained LM. This significantly speeds up the process of fine-tuning the NLP model.

The objective function representing the topic related part of the NLP model is the TM objective ($L_{TM}$) function that is based on the TM output vector ($\hat{x}$). In particular, the TM objective function ($L_{TM}$) is based on the difference between the TM output vector ($\hat{x}$) and the respective label corresponding to the input training text document. The TM objective function ($L_{TM}$) may, besides the TM output vector ($\hat{x}$), also be based on a Kullback-Leibler Divergence (KLD) between the true data distribution and model distribution (i.e., estimated by the model) during training/learning. In particular, the TM objective function ($L_{TM}$) may be calculated as:

$$L_{TM} = p(\hat{x}) + KLD.$$

The objective function representing the context related part of the NLP model is the LM objective function ($L_{BERT}$) that is based on the processed output vector (y). In particular, the LM objective function ($L_{BERT}$) is based on the difference between the processed output vector (y) and the respective label corresponding to the input training text document. The LM objective function ($L_{BERT}$) may, besides the processed output vector (y), also be based on a token vector ($x_B$), which represents the input training text document at an input layer of the large-scale pre-trained LM. In particular, the LM objective function may be calculated as:

$$L_{BERT} = \text{soft max}(W \cdot h_p + b),$$

where b denotes the total number of batches (training text documents) in one epoch (training step).

The joint objective function ($L_{TopicBERT}$) may be a weighted linear combination of the TM objective function ($L_{TM}$) and the LM objective function ($L_{BERT}$). In particular, the joint objective function may be calculated as:

$$L_{TopicBERT} + (1-\alpha)L_{BERT} + \alpha L_{TM},$$

where $\alpha$ denotes a weight and $\alpha \in \{0.01; 0.9\}$.

By means of the joint objective function ($L_{TopicBERT}$) the scalable parameters of the NN-based TM, the large-scale pre-trained LM, and the at least one processing layer are updated based on topic information and context information derived from the input training text document.

With the iterative steps of training the NLP model during fine-tuning, the NLP model can be fine-tuned to preform particularly higher or alternatively in particularly less training time than common NLP models and additionally.

In some embodiments, the NN-based TM is a Neural Variational Document Model (NVDM). In some embodiments, the large-scale pre-trained LM is a Bidirectional Encoder Representations from Transformers (BERT) model. In some embodiments, the at least one processing layer is at least one classification layer.

The NVDM is an unsupervised generative model of text which aims to extract a continuous semantic latent variable for each document. It can be interpreted as a variational auto-encoder: an MLP encoder (inference network) compresses the bag-of-words document representation into a continuous latent distribution, and a softmax decoder (generative model) reconstructs the document by generating the words independently. A primary feature of the NVDM is that each word is generated directly from a dense continuous document representation (Miao Yishu, Lei Yu and Phil Blunsom. "Neural Variational Inference for Text Processing." ICML (2016).).

The BERT model is a multi-layer bidirectional Transformer encoder (Ashish Vaswani, Noam Shazeer, Niki Parmar, Jakob Uszkoreit, Llion Jones, Aidan N Gomez, Lukasz Kaiser, Illia Polosukhin. "Attention is all you need." In Advances in Neural Information Processing Systems (2017), pages 6000-6010). Providing a common BERT model for a specific task includes two steps: pre-training and fine-tuning. During pre-training, the BERT model is trained on unlabelled data over different pre-training tasks. For fine-tuning, the BERT model is first initialized with the pre-trained parameters, and all of the parameters are fine-tuned using labelled data from the downstream tasks. (Devlin, Jacob, Ming-Wei Chang, Kenton Lee and Kristina Toutanova. "BERT: Pre-training of Deep Bidirectional Transformers for Language Understanding." NAACL-HLT (2019).).

The NLP model fine-tuned using teachings of the present disclosure is particularly well suited for classification of long sequence text documents. FIG. 1 shows an example embodiment of a computer-implemented method of fine-tuning Natural Language Processing (NLP) models incorporating teachings of the present disclosure and a corresponding computer program is schematically depicted.

The computer-implemented method comprises the steps of providing S1 at least one training data set, providing S2 a NLP model, and fine-tuning S3 fine-tuning. The step of fine-tuning S3 the NLP model comprises the iterative steps of inputting S31 one training text document, generating S32 a document topic proportion ($h_{TM}$) and a TM output vector ($\hat{x}$), generating S33 a contextualized document representation ($o_{CLS}$), combining and projecting S34, generating S35 a processed output vector (y), combining S36 and updating S37.

In the step of providing S1 at least one training data set, at least one training data set including a multitude of long-sequence training text documents, in particular tender documents, 5 (see FIGS. 2 to 4) is provided for fine-tuning (i.e. training) the NLP model provided in the step of providing S2 an NLP model. The provided at least one training data set further comprises labels as ground truth, against which the NLP model is fine-tuned/trained. For each training text document a corresponding label is included in the provided at least one set of training data.

In the step of providing S2 a NLP model, the NLP model 1 (see FIGS. 2 to 4) is provided. The NLP model includes two parallel sections. One section is a Neural Network (NN) based Topic Model (TM) 2 (see FIGS. 2 to 4) having scalable TM parameters. The other section is a large-scale pre-trained Language Model (LM) 3 (see FIGS. 2 to 4) having scalable LM parameters. The NLP model further includes at least one processing layer 4 (see FIG. 4) having scalable processing parameters. The NN-based TM and large-scale pre-trained LM are arranged in parallel to each other such that both receive the same training text document as input. The downstream at least one processing layer receives input from both, the NN-based TM and large-scale pre-trained LM.

In the step of fine-tuning S3, the provided NLP model is fine-tuned. Thereto, the NN-based TM and the parallel large-scale pre-trained LM as well as the downstream at least one processing layer are jointly trained. From an input training text document of the multitude of training text documents a document topic proportion $h_{TM}$ is generated from the NN-based TM based on its scalable TM parameters. In parallel, from the same input training text document or a decreased sequence 5' (see FIGS. 3 and 4) thereof a contextualized document representation $o_{CLS}$ is generated by the large-scale pre-trained LM based on its scalable LM parameters. The generated document topic proportion $h_{TM}$ and the contextualized document representation $o_{CLS}$ are combined and projected into a projected vector $h_p$. The projected vector $h_p$ is input to the at least one processing layer. Based on said projected vector $h_p$ the NN-based TM and the large-scale pre-trained LM as well as the at least one processing layer are jointly trained, i.e. their respective scalable parameters are updated.

This fine-tuning is achieved by iteratively executing the steps S31 to S37 for each training text document of at least a sub-set of the at least one training data set provided in step S1. The iteration of the steps S31 to S37 for a current training text document may be stopped in case a stop criterion is fulfilled. The stop criterion may, for example, be convergence of a difference of the output generated by the NLP model for a current training text document and the corresponding label to a pre-defined convergence value, reaching a predefined maximal number of iterations, or the like.

In the step of inputting S31 one training text document, at least one training text document of the multitude of training text documents is input to the NN-based TM and also to the parallel large-scale pre-trained LM which is arranged in parallel to the NN-based TM. Instead of the whole training text document only a decreased sequence of the same training text document can be input to the large-scale pre-trained LM.

In the step of generating S32 document topic proportion $h_{TM}$ and a TM output vector $\hat{x}$, the document topic proportion $h_{TM}$ and a TM output vector $\hat{x}$ are generated. Both are generated by the NN-based TM from the input training text document based on the scalable TM parameters. The TM output vector $\hat{x}$ is based on the document topic proportion $h_{TM}$, which is the last latent or hidden state of the NN-based TM and represents topic information about the input training text document.

In the step of generating S33 a contextualized document representation $o_{CLS}$, the contextualized document representation $o_{CLS}$ is generated by the large-scale pre-trained LM from the same input training text document or rather from the decreased subsequence thereof based on the scalable LM parameters. The contextualized document representation $o_{CLS}$ represents context information about the input training text document.

In the step of combining and projecting S34, the generated document topic proportion $h_{TM}$ and the generated contextualized document representation $o_{CLS}$ are concatenated and projected into the projected vector $h_p$:

$$h_p = o_{CLS} \oplus h_{TM}.$$

Alternatively, may be the generated document topic proportion $h_{TM}$ and the generated contextualized document representation $o_{CLS}$ may be weighted, linearly combined and projected into the projected vector $h_p$. The projected vector $h_p$ contains the merged topic and context information of the document topic proportion $h_{TM}$ and the contextualized document representation $o_{CLS}$.

In the step of generating S35 a processed output vector y, a processed output vector y is generated by the at least one processing layer from the projected vector $h_p$ based on the processing parameters.

In the step of combining S36, an TM objective function $L_{TM}$, which is based on the TM output vector $\hat{x}$ of the NN-based TM, and an LM objective function $L_{BERT}$, which is based on the processed output vector y of the at least one processing layer are combined into a joint objective function $L_{TopicBERT}$. In particular, the TM objective function $L_{TM}$ is calculated as:

$$L_{TM} = p(\hat{x}) + KLD,$$

where KLD is a Kullback-Leibler Divergence. The LM objective function is calculated as:

$$L_{BERT} = p(y|x_B) = \text{soft max}(W h_p + b),$$

where $x_B$ denotes a text vector based on the input (training) text document or based on the decreased sequence and b denotes the total number of batches (training text documents) in one epoch (training step). The joint objective function is calculated as:

$$L_{TopicBERT} = (1-\alpha)L_{BERT} + \alpha L_{TM},$$

where a denotes a weight and $\alpha \in \{0.01; 0.9\}$.

In the step of updating S37 the scalable TM parameters of the NN-based TM, the scalable LM parameters of the large-scale pre-trained LM, and the scalable processing parameters of the at least one processing layer are updated based on the joint objective function $L_{TopicBERT}$. Thus, the NN-based TM, the large-scale pre-trained LM, and the at least one processing layer are updated based on both, topic information and context information, derived from the input training text document.

Figure 2:
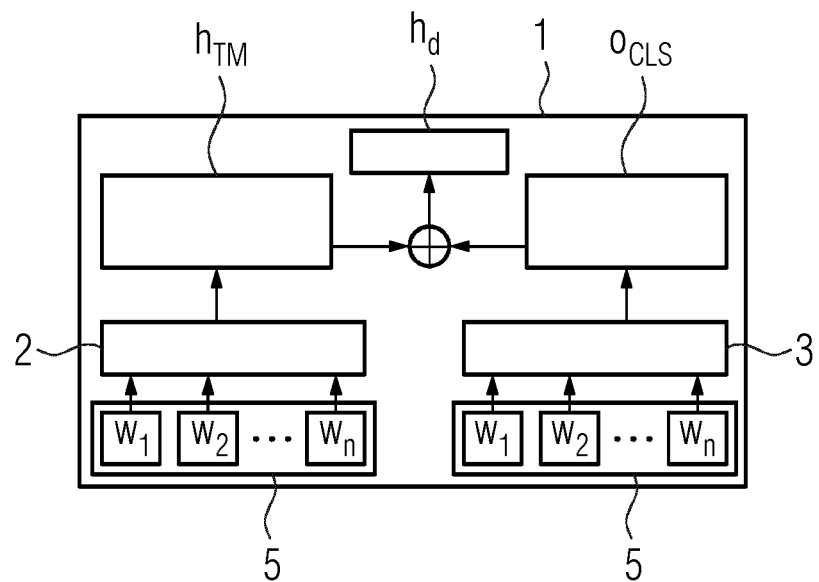
FIG. 2 shows a schematic view of an embodiment of the NLP model incorporating teachings of the present disclosure.

In FIG. 2 an example embodiment of the NLP model 1 (TopicBERT model) incorporating teachings of the present disclosure is schematically depicted. The NPL model 1 comprises the NN-based TM 2 and the large-scale pre-trained LM 3 arranged in parallel. Both receive a (training) text document 5 as input. The (training) text document 5 is represented as a text vector including several word-tokens $w_1$ to $w_n$ which each may correspond to one successive word of the (training) text document or to other parts thereof. Here, both, the NN-based TM 2 and the large-scale pre-trained LM 3, receive the complete (training) text document 5 as input.

The NN-based TM 2 generates the document topic proportion $h_{TM}$ from the input (training) text document 5. The large-scale pre-trained LM 3 generates contextualized document representation ons from the input (training) text document 5.

The document topic proportion $h_{TM}$ and the contextualized document representation $o_{CLS}$ are concatenated and projected into the projected vector $h_p$.

The embodiment of the NLP model 1 according to FIG. 2 may be particularly effective in complementary learning. To explore the combination of the two complementary representations, contextual and topical, the NN-based TM 2 and the large-scale pre-trained LM 3 are jointly trained for fine-tuning the NLP model 1 for a specific processing task, e.g. for document classification (with at least one downstream classification layer 4 (see FIG. 4)).

In the composite model architecture, a full-sequence of the (training) text document, i.e. the complete/whole (training) text document, is input to the large-scale pre-trained LM 3. The document topic proportion $h_{TM}$ (latent topic feature) from the NN-based TM 2 is concatenated with the contextualized document representation $o_{CLS}$ from the large-scale pre-trained LM 3, with the aim to exploit complementary learning, while computing representations from topic and language models. In essence, document representations in the NLP model 1 (TopicBERT model) are both, topic-rich and context-rich. The resulting concatenation of the vectors from the TM 2 and the LM 3 is passed into projection operation and finally, processing like classification can be performed on the projected vector $h_p$.

Figure 3:
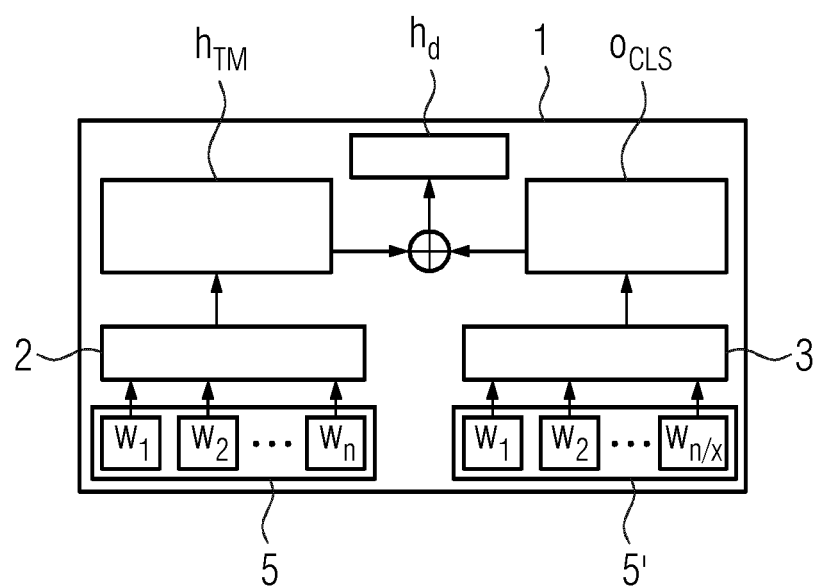
FIG. 3 shows a schematic view of a further embodiment of the NLP model incorporating teachings of the present disclosure.

In FIG. 3 a further embodiment of the NLP model 1 (TopicBERT model) incorporating teachings of the present disclosure is schematically depicted. NLP model 1 corresponds to the NLP model of FIG. 2, but instead of the complete (full sequence) training text document 5 only a decreased sequence 5' of the training text document is input to the large-scale pre-trained LM 3.

The embodiment of the NLP model 1 according to FIG. 3 may be particularly effective in efficient learning. Due to a self-attention mechanism, the computational time of fine-tuning per epoch of the large-scale pre-trained LM 31 is proportional to:

$$O(n^2 \times d \times i),$$

where n is the (decreased) sequence length of the text document, d is the representation dimension and i is the total number of the input sequence. This makes it challenging to fine-tune for longer sequence lengths.

FIG. 8 shows variations of computational cost and fine-tuning time per epoch O as the sequence length n of the input is varied, i.e. decreased. It can be seen as on decreasing the input sequence length to n/8, the per epoch time O also decreases by T/8 assuming the GPU parallelization does not vary for the different sequence lengths. The NLP model 1 according to FIG. 3 can, thus, be applied for efficient learning, as the time for fine-tuning the whole NLP model 1 is reduced due to the reduced time for training the large-scale pre-trained LM 3 with the decreased sequence 5' of the training text document 5.

As the co-occurrence of word is on document level maintaining the long-ranged semantics, the input sequence length to the large-scale pre-trained LM 3 can be significantly reduced while retaining the overall performance.

Another very sensitive issue with fine-tuning large-scale pre-trained LMs is immense $CO_2$ emission. High $CO_2$ emission is dangerous because of $CO_2$'s effect as a greenhouse gas, meaning that it absorbs and emits infrared radiation in the wavelength range emitted by the Earth, which contributes to the global warming of the planet.

Figure 7:
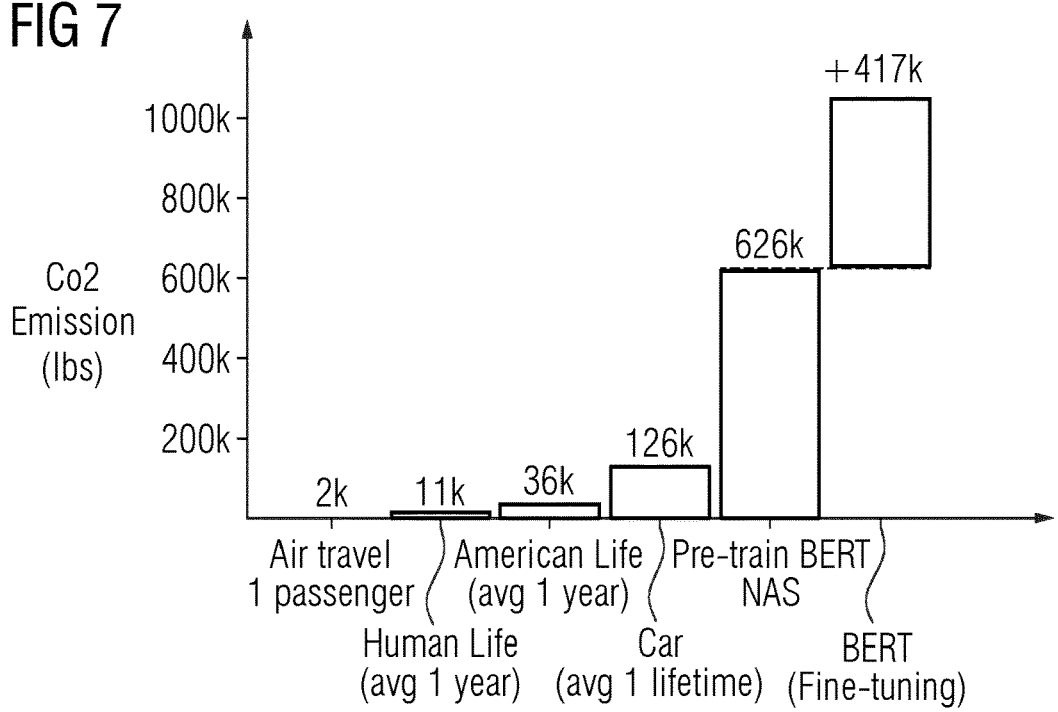
FIG. 7 shows a chart of exemplary $CO_2$ emissions of pre-training and fine-tuning a common large-scale LM incorporating teachings of the present disclosure.

As depicted in FIG. 7, studies show that the amount of carbon emitted by pre-training and fine-tuning large-scale LMs like BERT models and other transformer-based models is higher than the carbon emission by a car in one lifetime. Fine-tuning of a BERT model emits 417.000 lbs of carbon. Note the amount of CO2 emission due to pre-training and fine-tuning the BERT model for long-sequence lengths tasks such as document classification. The teachings herein may be useful for reducing the computational cost of fine-tuning BERT for downstream tasks, such as document classification.

Pre-training BERT for language modelling has much higher carbon footprints compared to $CO_2$ emission by a car in its lifetime. Since the task of pre-training a BERT model on large corpora is often infrequent as compared to using a pre-trained BERT model for downstream NLP tasks such as document classification, therefore the present invention helps reducing carbon footprints in using a pre-trained large scale LM, in particular, a BERT model and fine-tuning it for long-sequence document classification tasks. Observe that the fine-tuning of a BERT model emits 417.000 lbs of $CO_2$ which is significantly high. The use of complementary learning may serve to reduce fine-tuning time and thus, carbon footprints for fine-tuning long-sequence pre-trained LMs for example for document classification tasks.

A known tool for computing carbon emission is used to analyze the contribution of large models like BERT models on carbon footprints. The $CO_2$(kg eq.) is calculated as:

$$CO_2[\text{kg eq.}] = \text{Power}[kW] \times \text{Time}[h] \times Co_{2\ localgrid}[\text{kg eq./kWh}],$$

where $CO_{2\ localgrid}$[kg eq./kWh]=impact/offset.

Here, $CO_2$(kg eq.) is a standardized measure of describing how much warming a given amount of gas will have in the atmosphere. Here impact quantifies the effect of $CO_2$ emitted in the local computation grid on the environment. Offset quantifies the effort made for reduction in emission of $CO_2$. The money paid with the help of carbon offsetting is invested towards various renewable energy and energy-efficient projects like building solar farms, hydro-electric dams, and extracting bio-fuel, etc. Carbon efficiency is the amount of $CO_2$ emitted per unit energy. Current techniques like BERT models are carbon inefficient due to their excessive computational units. The NLP model 1 according to FIG. 3 instead is carbon efficient, as the time for fine-tuning is considerably reduced.

Figure 4:
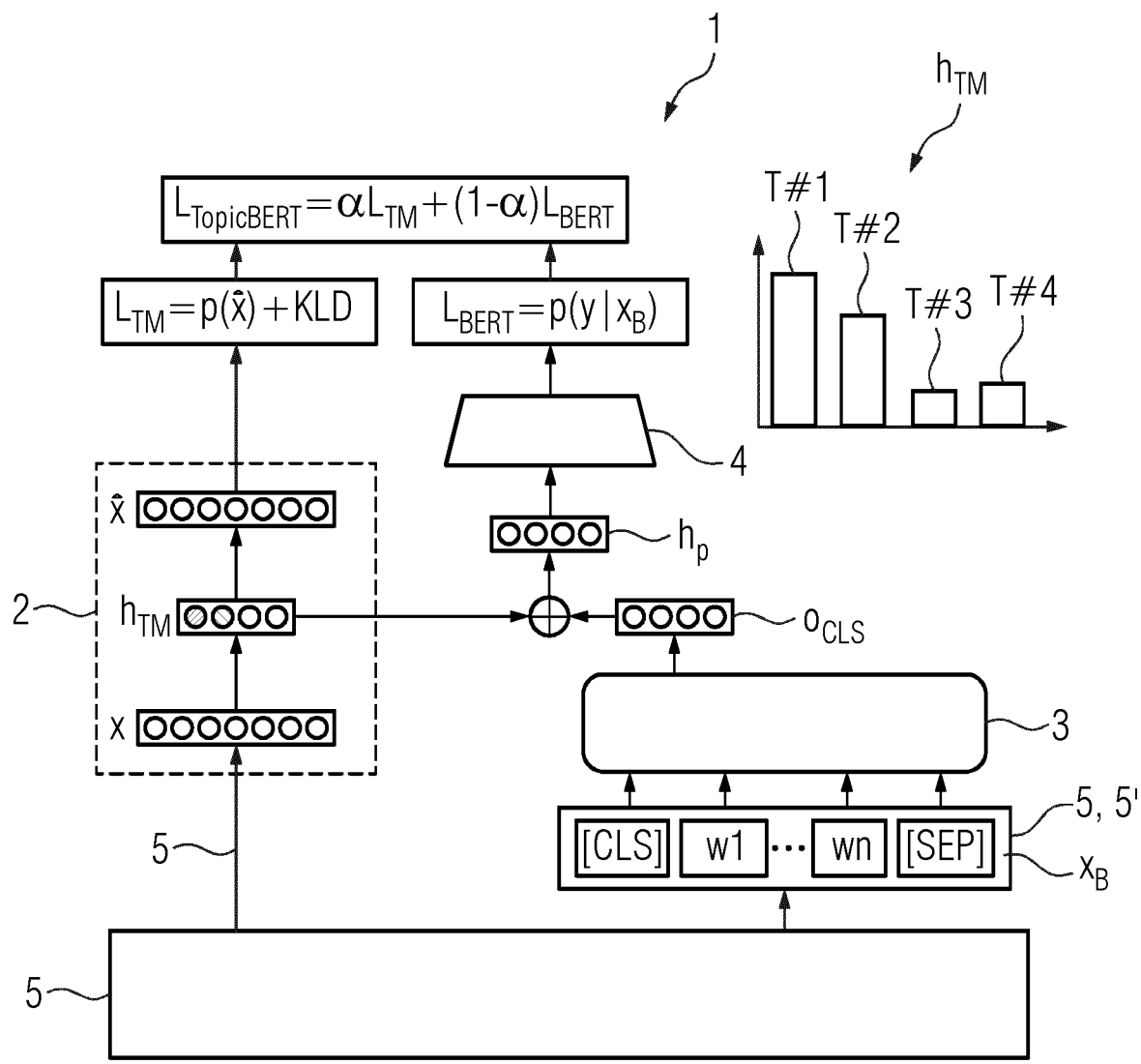
FIG. 4 shows a schematic view of a further embodiment of the NLP model incorporating teachings of the present disclosure.

In FIG. 4 a further embodiment of the NLP model 1 incorporating teachings of the present disclosure is schematically depicted. The NLP model 1 corresponds to the NLP models of FIGS. 2 and 3, but more details about the structure of the NLP model 1 are depicted here. Besides the NN-based TM 2 and the large-scale pre-trained LM 3 the NLP model 1 further includes downstream at least one processing layer 4, here exemplarily one classification layer.

The NN-based TM 2 receives a (training) text document 5 and generates therefrom the document topic proportion $h_{TM}$ based on its scalable (after the fine-tuning fixed) TM parameters. Here, the document topic proportion $h_{TM}$ comprises information about the probability of exemplarily four topics T #1 to T #4. Based on the document topic proportion $h_{TM}$ the TM output vector $\hat{x}$ is generated. The NN-based TM 2 is here exemplarily a Neural Variational Document Model (NVDM).

The large-scale pre-trained LM 3 receives the same text document 5 as the NN-based TM 2 or, alternatively, the decreased sequence 5' of said text document 5. The text document 5 or rather the decreased sequence 5' is input to the LM 3 as tokenized text vector $x_B$. The text vector $x_B$ comprises a, several word-tokens $[w_1]$ to $[w_n]$ and a separator token [SEP] at the end of a (sub-) sequence or string. The first special token [CLS] is used to generate the contextualized document representation $o_{CLS}$ based on the scalable (after the fine-tuning fixed) LM parameters. The large-scale pre-trained LM 3 is here exemplarily a Bidirectional Encoder Representatio$_{CLS}$ from Transformers (BERT) model.

The at least one processing layer 4 receives the projected vector $h_p$ which is concatenated and projected from the document topic proportion $h_{TM}$ and from the contextualized document representation $o_{CLS}$. Consequently, the projected vector $h_p$ includes the combined topic information and context information extracted from the input text 5 or rather the decreased sequence 5' by the NN-based TM 2 and by the large-scale pre-trained LM 3, respectively. From the projected vector $h_p$ the processed output vector y is generated by the at least one processing layer 4 based on its scalable (after the fine-tuning fixed) processing parameters. Here, the processed output vector y includes a classification of the input text document 5.

During fine-tuning of the NLP-model 1 the scalable TM parameters, the scalable LM parameters and the scalable processing parameters are updated based on the joint objective function $L_{TopicBERT}$. The joint objective function is calculated from the TM objective function $L_{TM}$, which is based on the document topic proportion $h_{TM}$, and from the LM objective function $L_{BERT}$, which is based on the processed output vector y and optionally on the text vector $x_{\tilde{B}}$. In particular, the joint objective function $L_{TopicBERT}$ is calculated according to the above-mentioned formulas:

$$L_{TopicBERT} = (1-\alpha)L_{BERT} + \alpha L_{TM},$$

$$L_{BERT} = p(y|x_B) = \text{soft max}(W \cdot h_p + b),$$

$$L_{TM} = p(\hat{x}) + KLD.$$

Figure 5:
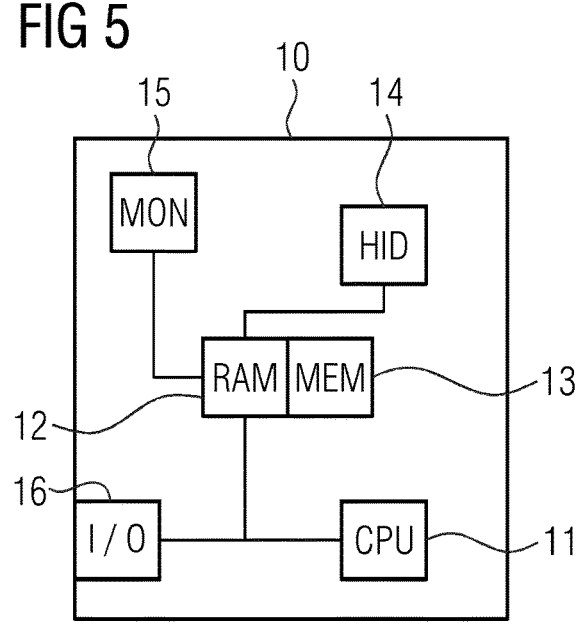
FIG. 5 shows a schematic view of an example embodiment of the data processing system for hosting NLP models incorporating teachings of the present disclosure.

In FIG. 5 an example embodiment of a data processing system 10 incorporating teachings of the present disclosure is schematically depicted. The data processing system 10 may be a personal computer (PC), a laptop, a tablet, a server, a distributed system (e.g. cloud system) and the like. The data processing system 10 comprises a central processing unit (CPU) 11, a memory having a random access memory (RAM) 12 and a non-volatile memory (MEM, e.g. hard disk) 13, a human interface device (HID, e.g. keyboard, mouse, touchscreen etc.) 14, an output device (MON, e.g. monitor, printer, speaker, etc.) 15 and an interface (I/O) 16 for receiving and sending data. The CPU 11, RAM 12, HID 14 MON 15 and I/O 16 are communicatively connected via a data bus. The RAM 12 and MEM 13 are communicatively connected via another data bus.

The data processing system can host the NLP model 1 according to the present invention and schematically depicted in FIGS. 2 to 4. In particular, the CPU 11 and the RAM 12 implement the NLP model 1 including the NN-based TM 2 and the parallel large-scale pre-trained TM 3 as well as the at least one downstream processing (i.e. classification) layer 4.

A computer program incorporating teachings of the present disclosure and schematically depicted in FIG. 1 can be loaded into the RAM 12 from the MEM 13 or another computer-readable medium 20. According to the computer program, the CPU executes the steps S1 to S3 and iteratively the steps S31 to S37 of the computer-implemented method according to the first aspect of the present invention and schematically depicted in FIG. 1. The execution can be initiated and controlled by a user via the HID 14. The status and/or result of the executed computer program may be indicated to the user by the MON 15 or output via the I/O 16. The result of the executed computer program may be permanently stored on the non-volatile MEM 13 or another computer-readable medium.

In some embodiments, the CPU 11 and RAM 12 for executing the computer program may comprise several CPUs 11 and several RAMS 12 for example in a computation cluster or a cloud system. The HID 14 and MON 15 for controlling execution of the computer program may be comprised by a different data processing system like a terminal communicatively connected to the data processing system 10 (e.g. cloud system).

Figure 6:
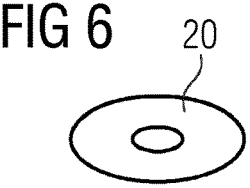
FIG. 6 shows a schematic view of an example embodiment of the computer-readable medium incorporating teachings of the present disclosure.

In FIG. 6 an embodiment of the computer-readable medium 20 incorporating teachings of the present disclosure is schematically depicted.

Here, exemplarily a computer-readable storage disc 20 like a Compact Disc (CD), Digital Video Disc (DVD), High Definition DVD (HD DVD) or Blu-ray Disc (BD) has stored thereon the computer program according to the third aspect of the present invention and as schematically shown in FIG. 1. However, the computer-readable medium may also be a data storage like a magnetic storage/memory (e.g. magnetic-core memory, magnetic tape, magnetic card, magnet strip, magnet bubble storage, drum storage, hard disc drive, floppy disc or removable storage), an optical storage/memory (e.g. holographic memory, optical tape, Tesa tape, Laserdisc, Phasewriter (Phasewriter Dual, PD) or Ultra Density Optical (UDO)), a magneto-optical storage/memory (e.g. MiniDisc or Magneto-Optical Disk (MO-Disk)), a volatile semiconductor/solid state memory (e.g. Random Access Memory (RAM), Dynamic RAM (DRAM) or Static RAM (SRAM)) or a non-volatile semiconductor/solid state memory (e.g. Read Only Memory (ROM), Programmable ROM (PROM), Erasable PROM (EPROM), Electrically EPROM (EE-PROM), Flash-EEPROM (e.g. USB-Stick), Ferroelectric RAM (FRAM), Magnetoresistive RAM (MRAM) or Phase-change RAM).

In FIG. 9 experimental results are listed. The NLP model incorporating teachings of the present disclosure, with a NVDM as NN-based TM and a BERT model as large-scale pre-trained LM as well as one classification layer as processing layer has been experimented with five datasets from various domains that are described below. The vocabulary size |V| is chosen after topic model specific preprocessing (i.e. removal of stop words), for larger datasets like Imdb, 20NS, AG-news and Ohsumed, words with frequency lower than 100 are removed. With smaller datasets like Reuters8 words with frequency lower than 10 are removed.

Following are the baselines for document classification tasks employed in the experiments:

CNN: Kim et al. (Yoon Kim. 2014. Convolutional neural networks for sentence classification. In Proceedings of the 2014 Conference on Empirical Methods in Natural Language Processing, EMNLP 2014, October 25-29, 2014, Doha, Qatar, A meeting of SIGDAT, a Special Interest Group of the ACL, pages 1746-1751. ACL) uses CNN for text classification where the word representations are initialized using word2vec embeddings. Here, the non-static variant has been used i.e. the embeddings are updated while training, as it has shown to outperform static variant by Kim et al. (2014) (?).

Log-BERTemb-CLS: Since BERT's CLS representations are used for NSP (Next Sentence Prediction) task during pre-training, they are enriched with generalization property of a document. Thus, here they have been used with logistic regression leveraging transfer learning.

Log-BERTemb-AVG: Rogers et al. (Anna Rogers, Olga Kovaleva, Anna Rumshisky. A Primer in BERTology: What we know about how BERT works. 2020) analyzes that although CLS representation of BERT generalizes the overall text instance, its token-wise representation captures contextualized knowledge, thus it is fair to compare the classification ability of the NLP model according to the present invention with averaged static token-wise embeddings of pre-trained BERT.

Log-BERTemb-AVG+LTF: Keeping in mind the aim of complementary learning, it would be interesting to study how BERT representation concatenated with latent topic feature (LTF) perform with logistic regression. Both representations are unaligned and capture different kinds of information. This initial baseline observation will help investigate whether this captured information is complementary or not.

BERT-x: Devlin et al. (Jacob Devlin, Ming-Wei Chang, Kenton Lee, and Kristina Toutanova. 2019. BERT: Pre-training of deep bidirectional transformers for language understanding. In Proceedings of the 2019 Conference of the North American Chapter of the Association for Computational Linguistics: Human Language Technologies, Volume 1 (Long and Short Papers), pages 4171-4186) uses CLS representation for fine-tuning BERT for sentence-level classification task. The document-level classification is not explored, using the full document as input to BERT making it strong baseline for our proposed model. Here x denotes the sequence length of the input.

An NLP model incorporating teachings of the present disclosure, e.g., a topic-aware BERT (TopicBERT) model, has been compared to document classification baselines for demonstrating complementary learning. Secondly, by reducing the sequence length of the input sequence to the BERT model during joint fine-tuning of the NLP model, fine-tuning time is reduced which in turn reduces carbon emission during fine-tuning and, thus, promotes very efficient learning. Topic-aware BERT for reduced sequence length is called TopicBERT-x where, x denotes sequence length. The hyper-parameters of the NVDM and the BERT model are shown in FIGS. 10 and 11, respectively.

The NLP model 1 has been evaluated against the five baselines described above in view of 1. F1-score, 2. performance Retention (Rtn), 3. average epoch fine-tuning time (Tavg), 4. total fine-tuning time, and 5. $CO_2$[kg eq.] emitted while fine-tuning. While fine-tuning on GPU, it has been observed that there is an irresolvable randomness which makes the reproducibility difficult. Therefore, experimentation has been conducted with three runs and the average (avg) as well as standard deviation (std) of F1 score has been calculated. The $CO_2$ kg eq. is calculated as described above. The g4dn-xlarge GPU has been used with maximum capacity of 70 W, $CO_2$ localgrid is taken from Lacoste, Luccioni and Schmidt et al. (Alexandre Lacoste, Alexandra Luccioni, Victor Schmidt, and Thomas Dandres. 2019. Quantifying the carbon emissio$_{CLS}$ of machine learning. arXiv preprint arXiv:1910.09700).

Results and Findings:

1. The Topic-aware BERT (TopicBERT) model according to the resent invention outperforms all the state-of-the-art baselines showing the gain of 1.604% for Reuters8, 0.537% for Imdb, 0.850% for 20NS, 0.319% for AGnews and 0.260% for Ohsumed, as compared to the BERT model, demonstrating the advantage of complementary learning.

2. Keeping in mind the effect of computationally extensive machine learning on the environment, it has been demonstrated that the Topic-aware BERT (TopicBERT) model requires drastically less fine-tuning time and produces significantly less $CO_2$ kg eq. as compared to the BERT model without much compromising on its learning capability. For Reuters8, topic-aware BERT (128sequence length) is 1.9 times faster, shows 1.9 times reduction in $CO_2$ emission and retains 99.25% performance as compared to BERT. For Imdb, topic-aware BERT (256 sequence length) is 1.2 times faster, shows 1.2 times reduction in $CO_2$ emission and retains 100.53% performance as compared to BERT. For 20 NS, topic-aware BERT (256 sequence length) is 1.2 times faster, shows 1.2 times reduction in $CO_2$ emission and retains 100% performance. For Ohsumed, topic-aware BERT (256 sequence length) is 1.2 times faster, shows 1.2 times reduction in $CO_2$ and retains 99.21% performance. For AGnews, topic-aware BERT (64 sequence length) is 1.3 times faster, shows 1.3 times reduction in $CO_2$ and retains 100.31% performance.

What is claimed is:

1. A method of fine-tuning Natural Language Processing (NLP) models, the method comprising:

providing a training data set including a multitude of training text documents;

providing a NLP model including a Neural Network (NN) based Topic Model (TM) having scalable TM parameters and a parallel large-scale pre-trained Language Model (LM) having scalable LM parameters;

fine-tuning the NLP model by jointly training the NN-based TM and the parallel large-scale pre-trained LM using a projected vector comprising a combination and projection of a document topic proportion generated by the NN-based TM based on the scalable TM parameters from an input training text document of the multitude of training text documents, and of a contextualized document representation generated by the large-scale pre-trained LM based on the scalable LM parameters from the same input training text document wherein the provided NLP model includes a downstream processing layer with scalable processing parameters; and fine-tuning the NN-based TM, the parallel large-scale pre-trained LM, and the downstream processing layer includes joint training, with the projected vector as input to the processing layer;

fine-tuning comprises, for each training text document of at least a sub-set of the provided at least one training data set, iteratively:

putting in one training text document of the multitude of training text documents to the NN-based TM and to the parallel large-scale pre-trained LM;

generating a document topic proportion and a TM output vector based on the document topic proportion from the input training text document by the NN-based TM using the scalable TM parameters;

generating a contextualized document representation from the same input training text document or a decreased fraction thereof by the large-scale pre-trained LM using the scalable LM parameters;

combining and projecting the generated document topic proportion and the generated contextualized document representation into the projected vector;

generating a processed output vector from the projected vector by the processing layer using the scalable processing parameters;

combining an TM objective function based on the TM output vector of the NN-based TM, and an LM objective function, using the processed output vector of the processing layer, into a joint objective function; and updating the scalable TM parameters of the NN-based TM, the scalable LM parameters of the large-scale pre-trained LM, and the scalable processing parameters of the processing layer using the joint objective function.

2. A method according to claim 1, wherein the contextualized document representation is generated by the large-scale pre-trained LM from an input decreased sequence of the same training text document.

3. A method according to claim 1, wherein:
the NN-based TM comprises a Neural Variational Document Model, NVDM; and/or
the large-scale pre-trained LM comprises a Bidirectional Encoder Representations from Transformers, BERT, model; and/or
the processing layer comprises a classification layer.

* * * * *